US012601656B2

(12) United States Patent
Kanai et al.

(10) Patent No.: US 12,601,656 B2
(45) Date of Patent: Apr. 14, 2026

(54) ROLLING BEARING ABNORMALITY DETECTION DEVICE AND ROLLING BEARING ABNORMALITY DETECTION METHOD

(71) Applicant: KABUSHIKI KAISHA KOBE SEIKO SHO (KOBE STEEL, LTD.), Hyogo (JP)

(72) Inventors: Keita Kanai, Kobe (JP); Toru Okada, Kobe (JP); Kazuo Yamaguchi, Takasago (JP)

(73) Assignee: KABUSHIKI KAISHA KOBE SEIKO SHO (KOBE STEEL, LTD.), Hyogo (JP)

( * ) Notice: Subject to any disclaimer, the term of this patent is extended or adjusted under 35 U.S.C. 154(b) by 327 days.

(21) Appl. No.: 18/577,152

(22) PCT Filed: Apr. 25, 2022

(86) PCT No.: PCT/JP2022/018707
§ 371 (c)(1),
(2) Date: Jan. 5, 2024

(87) PCT Pub. No.: WO2023/286414
PCT Pub. Date: Jan. 19, 2023

(65) Prior Publication Data
US 2024/0210278 A1     Jun. 27, 2024

(30) Foreign Application Priority Data
Jul. 14, 2021     (JP) ................................. 2021-116597

(51) Int. Cl.
*G01M 13/045*         (2019.01)

(52) U.S. Cl.
CPC .................................. *G01M 13/045* (2013.01)

(58) Field of Classification Search
CPC ............................. G01M 13/045; G01H 1/003
See application file for complete search history.

(56) References Cited

U.S. PATENT DOCUMENTS

2010/0030492 A1*    2/2010    Kar .......................... F16C 41/00
                                                              702/39

FOREIGN PATENT DOCUMENTS

JP            2017-101954 A       6/2017
WO        WO-2019221251 A1 *   11/2019   ............. G01M 13/04
WO        WO-2020183797 A1 *    9/2020   .......... G01M 13/045

OTHER PUBLICATIONS

English machine translation of Sakano, JP 2017-101954 A (Year: 2017).*

(Continued)

*Primary Examiner* — David Z Huang
(74) *Attorney, Agent, or Firm* — Studebaker Brackett PLLC

(57)                    ABSTRACT
A rolling bearing abnormality detection device of the present invention detects a vibration generated in a rolling bearing as vibration data, obtains a frequency spectrum thereof, identifies a frequency indicating a peak as a peak frequency from the frequency spectrum within a predetermined frequency range including a theoretical frequency that brings about a peak on the frequency spectrum during occurrence of an abnormality, sets the peak frequency as a monitoring peak frequency of a monitoring target in a case where the peak frequency changes with time, and determines whether an abnormality is present, based on a peak value of a peak corresponding to the monitoring peak frequency.

6 Claims, 9 Drawing Sheets

(56)                   References Cited

OTHER PUBLICATIONS

English Machine Translation of Yukawa et al., WO 2019/221251 A1
(Year: 2019).*

* cited by examiner

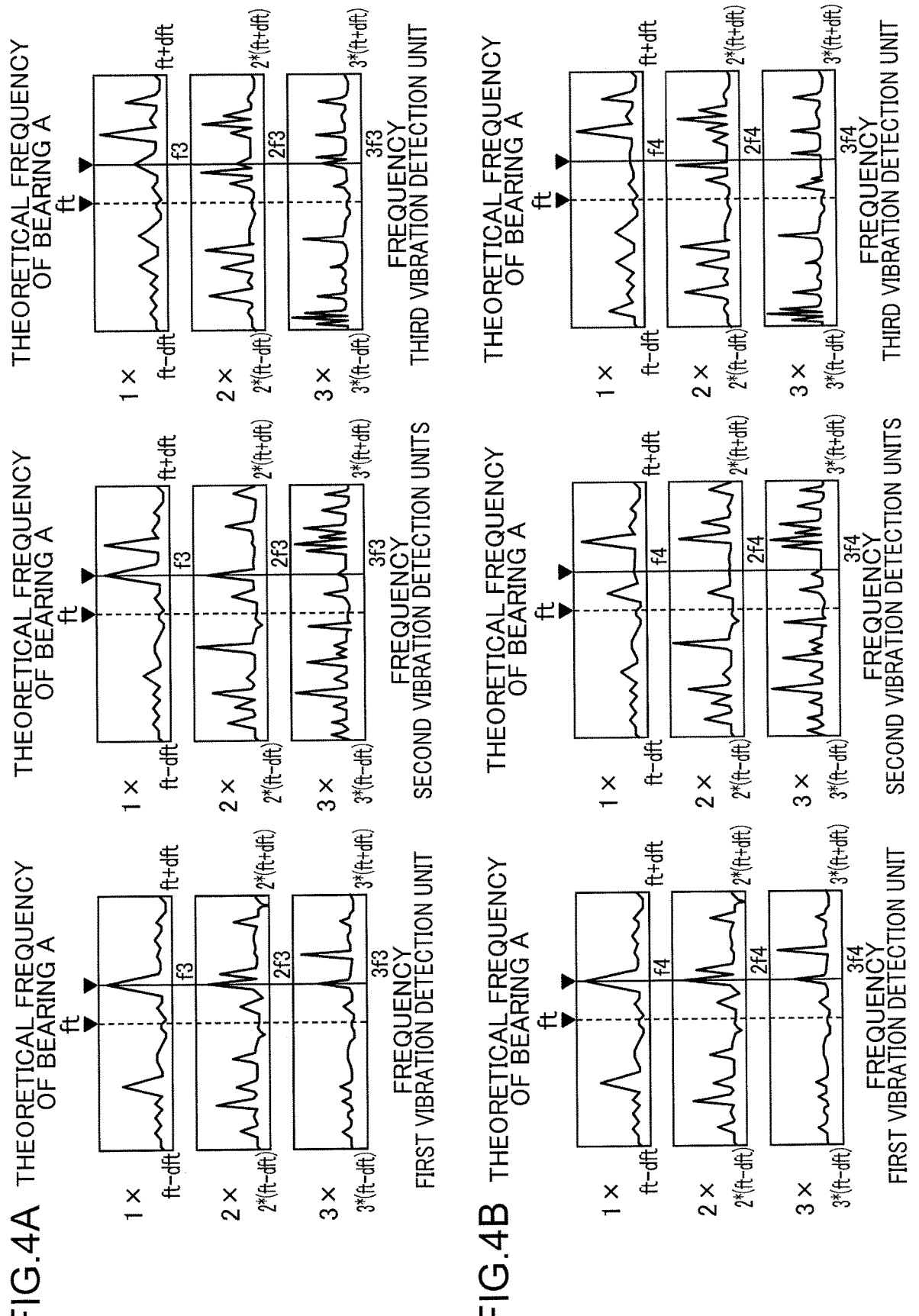

FREQUENCY
(ONE YEAR LATER)

FREQUENCY
(IMMEDIATELY AFTER
NEW INSTALLATION OR OVERHAUL)

Figure 8:
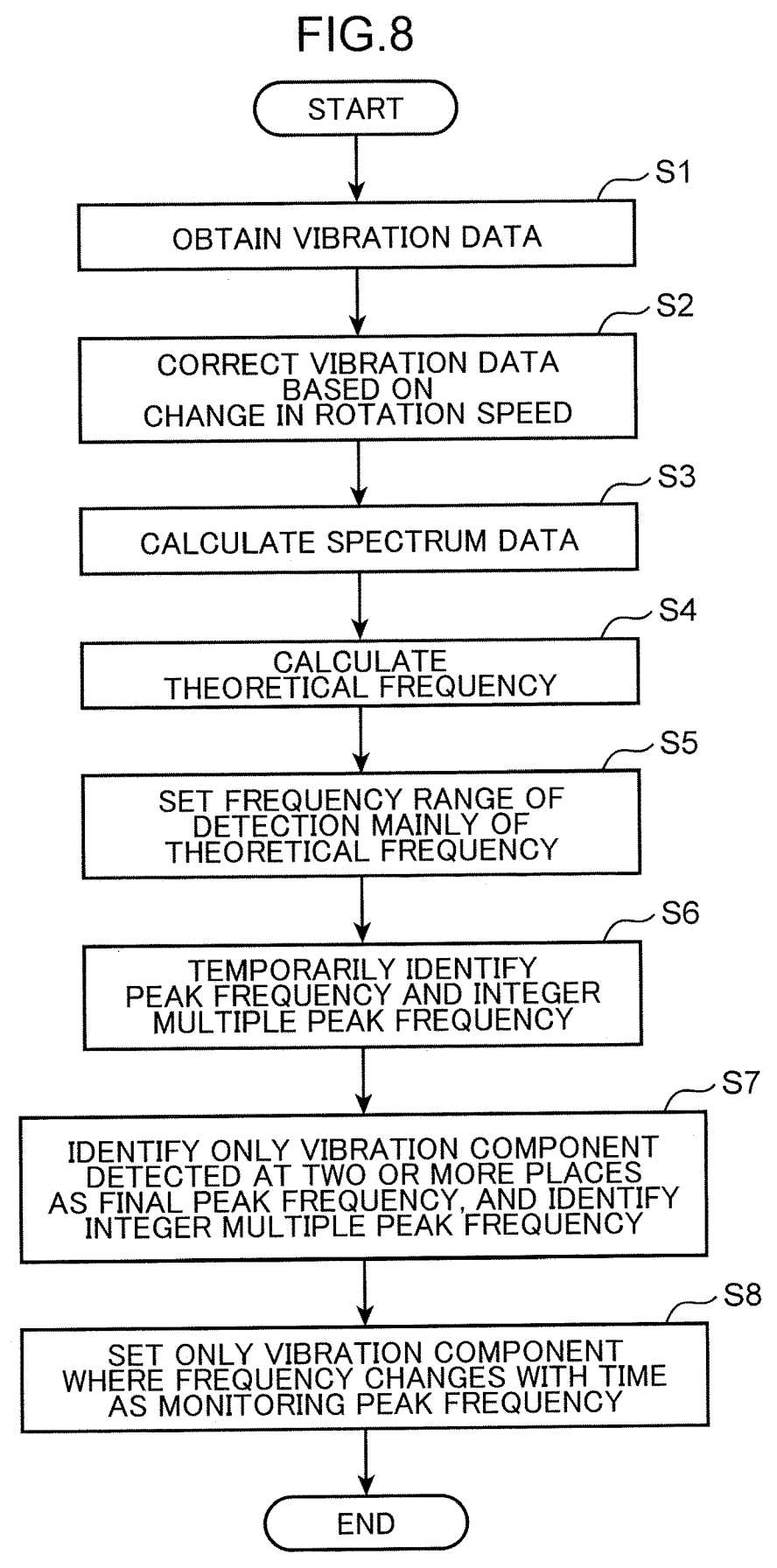

START

↓ S1

OBTAIN VIBRATION DATA

↓ S2

CORRECT VIBRATION DATA
BASED ON
CHANGE IN ROTATION SPEED

↓ S3

CALCULATE SPECTRUM DATA

↓ S4

CALCULATE
THEORETICAL FREQUENCY

↓ S5

SET FREQUENCY RANGE OF
DETECTION MAINLY OF
THEORETICAL FREQUENCY

↓ S6

TEMPORARILY IDENTIFY
PEAK FREQUENCY AND INTEGER
MULTIPLE PEAK FREQUENCY

↓ S7

IDENTIFY ONLY VIBRATION COMPONENT
DETECTED AT TWO OR MORE PLACES
AS FINAL PEAK FREQUENCY, AND IDENTIFY
INTEGER MULTIPLE PEAK FREQUENCY

↓ S8

SET ONLY VIBRATION COMPONENT
WHERE FREQUENCY CHANGES WITH TIME
AS MONITORING PEAK FREQUENCY

↓

END

FIG.9

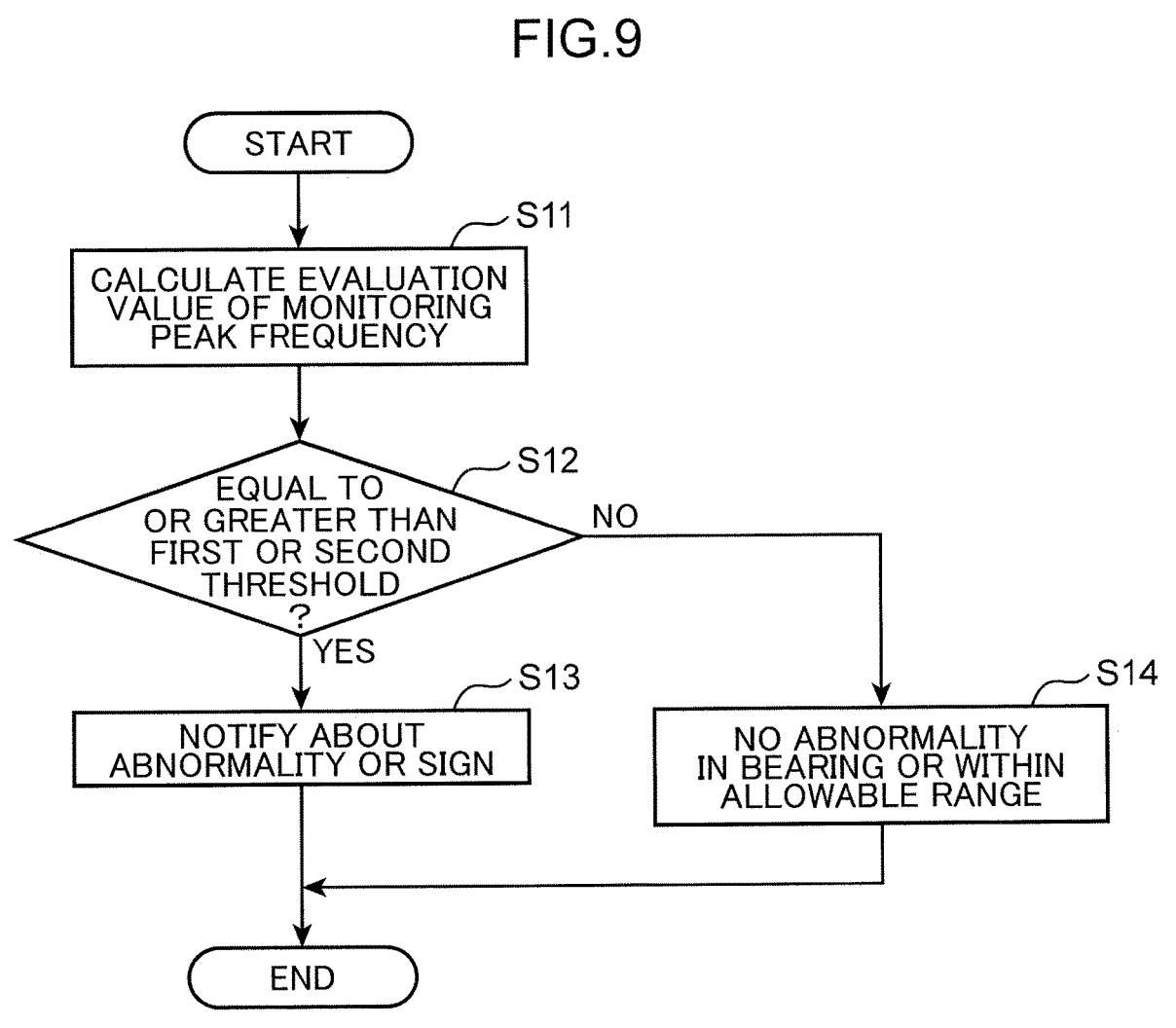

START

↓

CALCULATE EVALUATION
VALUE OF MONITORING
PEAK FREQUENCY          ⌐S11

↓

EQUAL TO
OR GREATER THAN
FIRST OR SECOND
THRESHOLD
?          ⌐S12          — NO →

YES

↓

NOTIFY ABOUT
ABNORMALITY OR SIGN          ⌐S13

NO ABNORMALITY
IN BEARING OR WITHIN
ALLOWABLE RANGE          ⌐S14

↓

END

ROLLING BEARING ABNORMALITY DETECTION DEVICE AND ROLLING BEARING ABNORMALITY DETECTION METHOD

TECHNICAL FIELD

The present invention relates to a rolling bearing abnormality detection device and a rolling bearing abnormality detection method for detecting an abnormality occurring in a rolling bearing.

BACKGROUND ART

A rolling bearing is a device that supports a load by placing a rolling element such as a ball or a roller between two members (a shaft and a bearing ring), and is provided in devices for various uses including a rotating body. In this rolling bearing, for example, smooth rolling is hindered by abnormalities such as abrasion (wear out or flaw), fatigue due to deformation, and fusion due to pressure, and a failure or the like of the device might occur. For this reason, for example, as proposed in Patent Literature 1, an abnormality of the rolling bearing is monitored.

A method for evaluating mechanical equipment disclosed in Patent Literature 1 is a method for evaluating mechanical equipment, the method for identifying presence or absence of an abnormality and an abnormal portion in the mechanical equipment where a rotating body rotates relative to a stationary member, the method including detecting a sound or a vibration generated by the mechanical equipment and outputting an electric signal corresponding to the detected sound or vibration, performing a frequency analysis on the electric signal and obtaining spectrum data, calculating, for each of a plurality of mechanical elements of the mechanical equipment, a theoretical frequency that brings about a peak value on a frequency spectrum during occurrence of an abnormality up to a predetermined order, based on rotation information about the rotating body, obtaining a minimum frequency difference that minimizes a difference between the theoretical frequencies among the plurality of mechanical elements up to at least one order, setting a detection range coefficient to 0.5 or less and setting the minimum frequency difference×the detection range coefficient of any order as a detection frequency range, and determining whether a peak frequency of the spectrum data is within a range of the theoretical frequency±the detection frequency range, and identifying an abnormal portion of the machine element based on a result of the determination.

Meanwhile, in Patent Literature 1, the presence or absence of an abnormality is diagnosed using the presence or absence of a peak of the spectrum data within the detection frequency range based on the theoretical frequency that brings about a peak value on a frequency spectrum during occurrence of an abnormality. However, in practice, in addition to the vibration in the rolling bearing, there are various vibrations such as, engagement of gears, a side band thereof, and a multiple component (harmonic component) of shaft rotation. Therefore, in the method disclosed in Patent Literature 1, another vibration other than the vibration in the rolling bearing might be erroneously detected as the vibration in the rolling bearing.

CITATION LIST

Patent Literature

Patent Literature 1: JP 2017-101954 A

SUMMARY OF INVENTION

The present invention has been made in view of the above circumstances, and an object thereof is to provide a rolling bearing abnormality detection device and a rolling bearing abnormality detection method capable of appropriately detecting a vibration in a rolling bearing.

In the rolling bearing abnormality detection device and the rolling bearing abnormality detection method of the present invention, a vibration generated in a rolling bearing is detected as vibration data, a frequency spectrum thereof is obtained, a frequency indicating a peak is identified as a peak frequency from the frequency spectrum within a predetermined frequency range including a theoretical frequency that brings about a peak on the frequency spectrum during occurrence of an abnormality, the peak frequency is set as a monitoring peak frequency of a monitoring target in a case where the peak frequency changes with time, and a determination is made whether an abnormality is present, based on a peak value of a peak corresponding to the monitoring peak frequency.

The above and other objects, features and advantages of the present invention will be apparent from the following detailed description and accompanying drawings.

BRIEF DESCRIPTION OF DRAWINGS

FIG. 4 is a schematic diagram for describing a method for identifying a peak frequency in a case where a plurality of vibration detection units is used.

FIG. 6 is a schematic diagram for describing a second method for setting the monitoring peak frequency.

FIG. 8 is a flowchart illustrating an operation of the rolling bearing abnormality detection device regarding a monitoring peak frequency setting mode.

FIG. 9 is a flowchart illustrating an operation of the rolling bearing abnormality detection device regarding an abnormality monitoring mode.

DESCRIPTION OF EMBODIMENT

Figure 1:
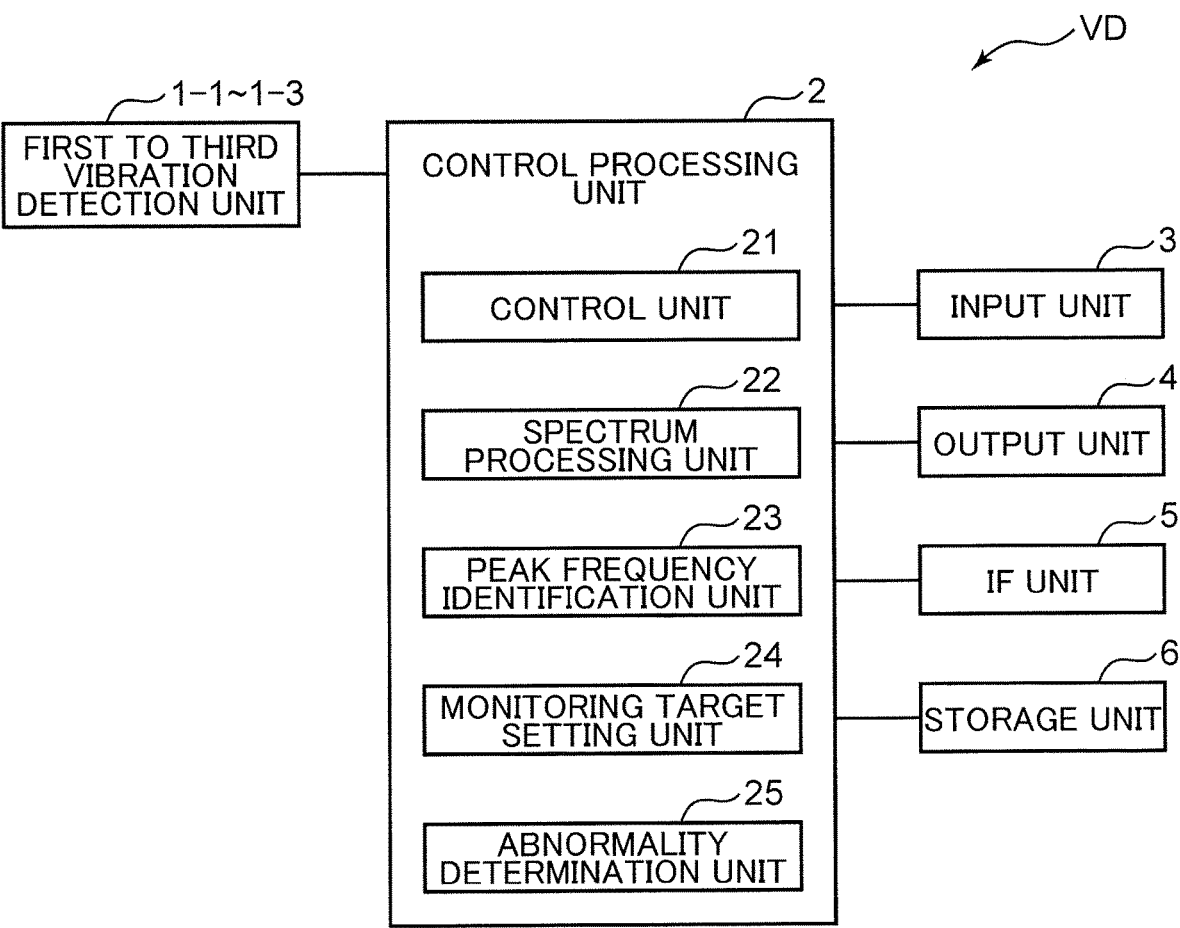
FIG. 1 is a block diagram illustrating a configuration of a rolling bearing abnormality detection device according to an embodiment.

Hereinafter, one or a plurality of embodiments of the present invention will be described with reference to the drawings. However, the scope of the invention is not limited to the disclosed embodiments. Note that in the drawings, the same reference signs denote the same components, and description thereof will be appropriately omitted. In the present specification, when components are collectively referred to, the components will be denoted by reference signs with suffixes omitted, and when components are individually referred to, the components will be denoted by reference signs with suffixes.

A rolling bearing abnormality detection device according to an embodiment includes, a vibration detection unit that detects a vibration generated in a rolling bearing as vibration data, a spectrum processing unit that obtains a frequency spectrum of the vibration data detected by the vibration detection unit, a peak frequency identification unit that identifies, as a peak frequency, a frequency indicating a peak within a predetermined frequency range including a theoretical frequency that brings about a peak on the frequency spectrum during occurrence of an abnormality, from the frequency spectrum obtained by the spectrum processing unit, a monitoring target setting unit that sets the peak frequency as a monitoring peak frequency of a monitoring target in a case where the peak frequency identified by the peak frequency identification unit changes with time, and an abnormality determination unit that makes a determination whether an abnormality is present in the rolling bearing, based on a peak value of a peak corresponding to the monitoring peak frequency set by the monitoring target setting unit. Hereinafter, a description will be given more specifically.

Figure 2:
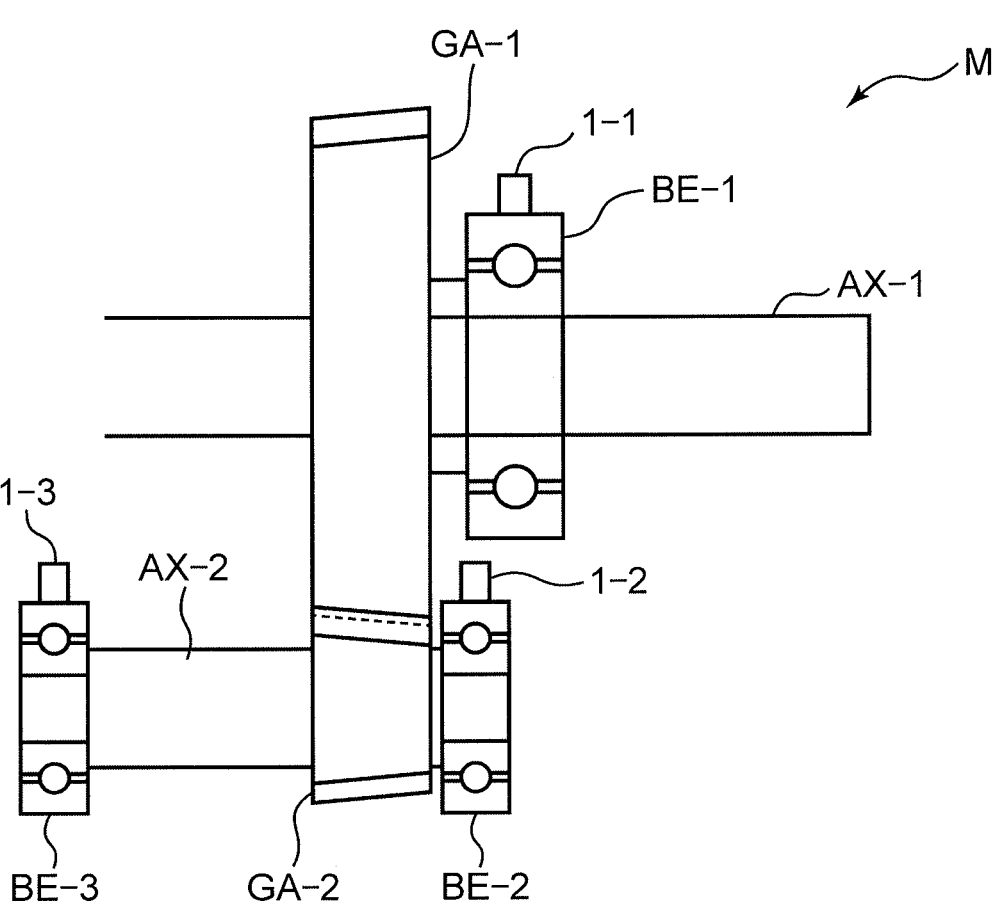
FIG. 2 is a diagram for describing mechanical equipment including a rolling bearing.
Figure 3:
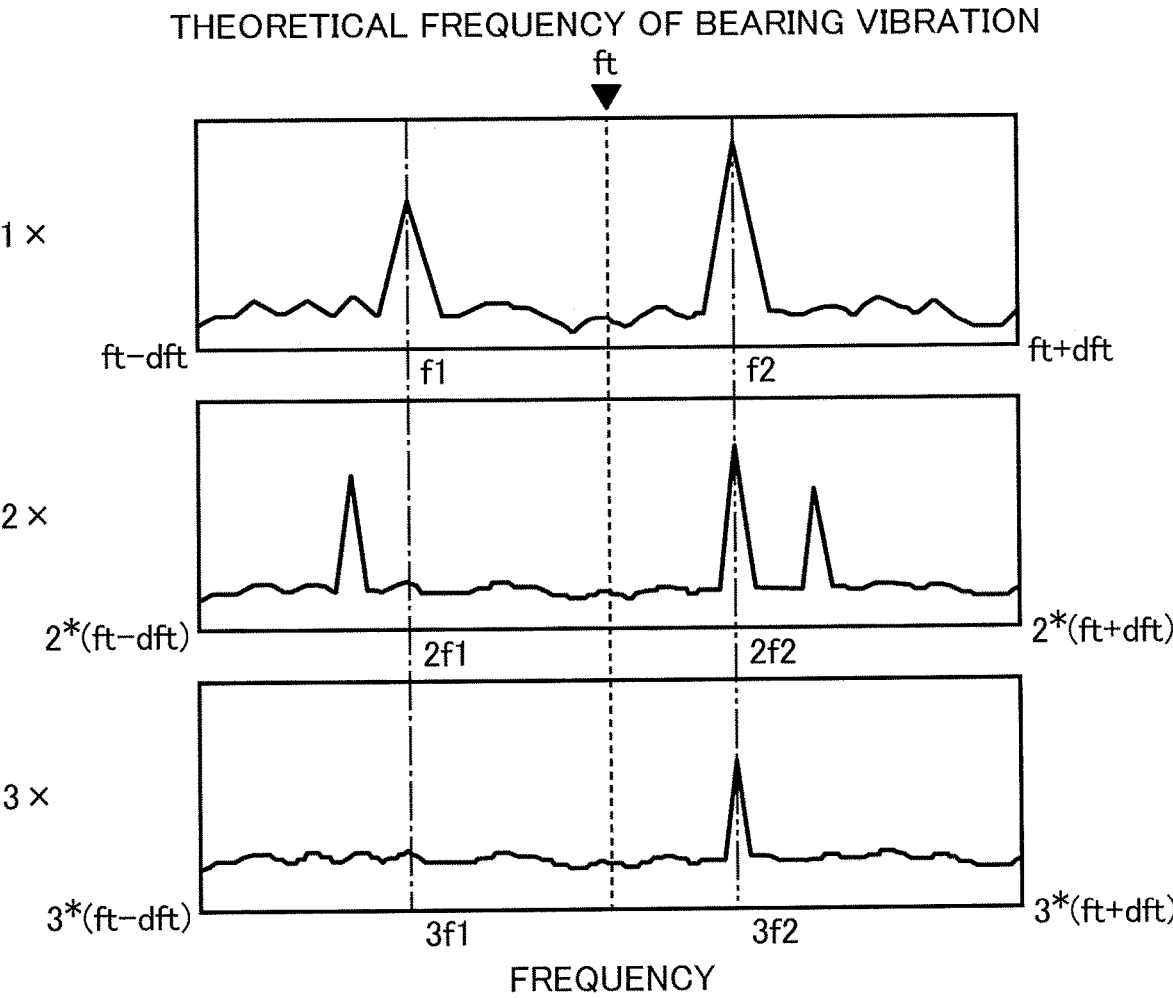
FIG. 3 is a schematic diagram for describing a method for identifying a peak frequency.
Figure 5B:
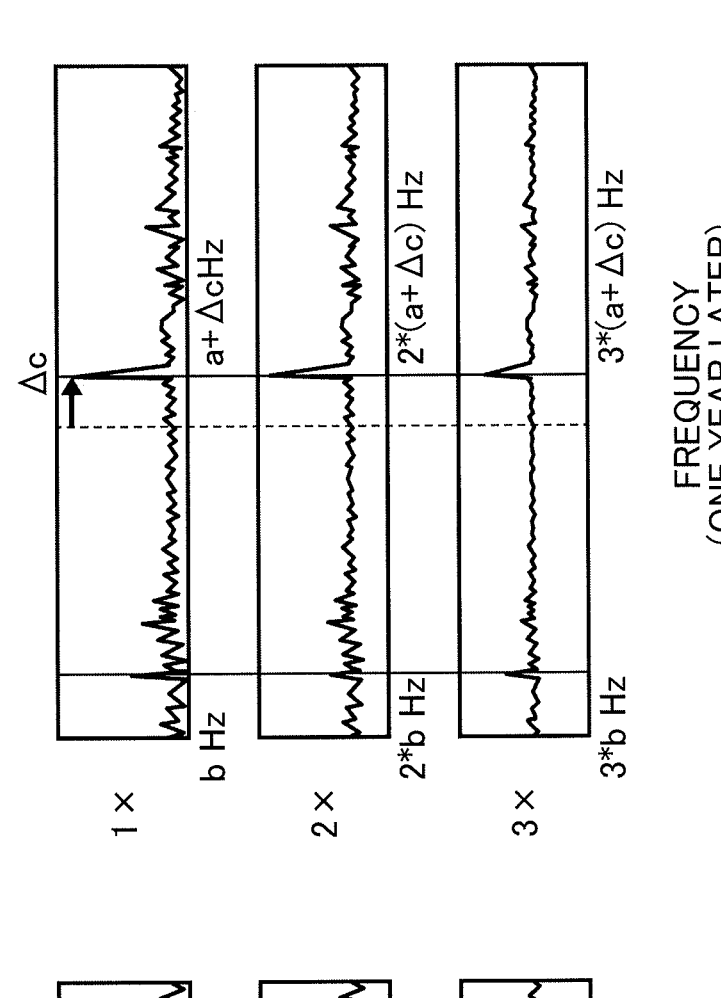
FIG. 5 is a schematic diagram for describing a first method for setting a monitoring peak frequency.
Figure 5A:
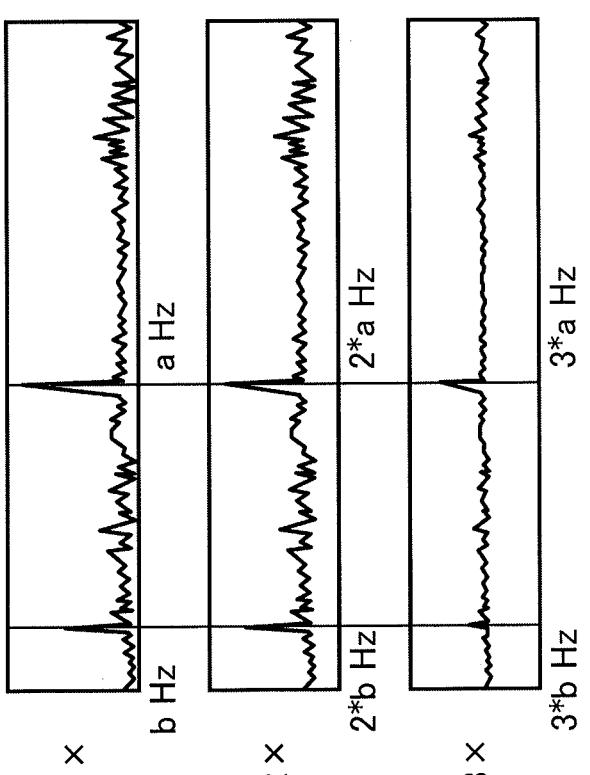
Figure 6:
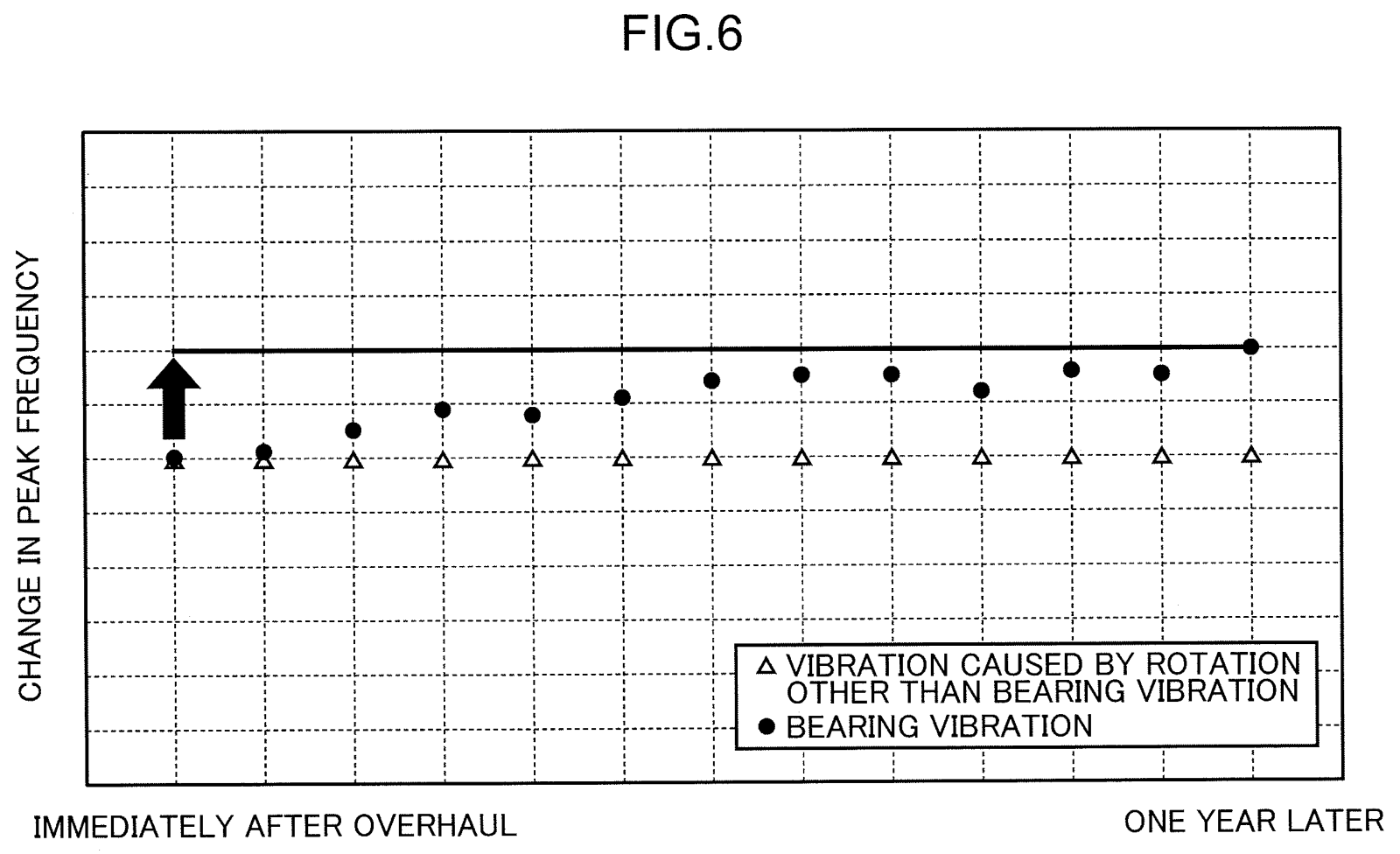
Figure 7:
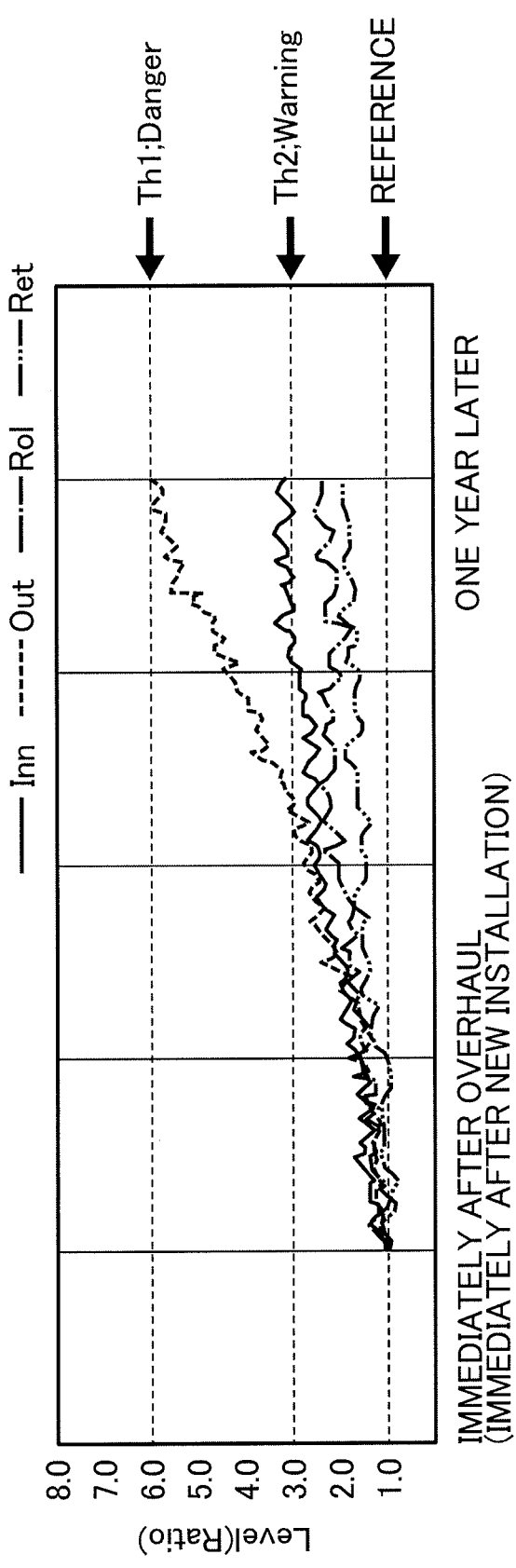
FIG. 7 is a schematic diagram for describing an abnormality determination method.

FIG. 1 is a block diagram illustrating a configuration of the rolling bearing abnormality detection device according to the embodiment. FIG. 2 is a diagram for describing mechanical equipment including the rolling bearing. FIG. 3 is a schematic diagram for describing a method for identifying a peak frequency. A top part of FIG. 3 illustrates a frequency spectrum within a frequency range of a theoretical frequency ft, and the top part of FIG. 3 illustrates the frequency spectrum within a frequency range of ft−dft to ft+dft with respect to the theoretical frequency ft. A middle part of FIG. 3 illustrates a frequency spectrum within a frequency range 2*ft−2*dft to 2*ft+2*dft twice the theoretical frequency ft. A bottom part of FIG. 3 illustrates a frequency spectrum within a frequency range 3*ft−3*dft to 3*ft+3*dft three times the theoretical frequency ft. In each drawing, a horizontal axis represents a frequency, and a vertical axis represents a level (magnitude). FIG. 4 is a schematic diagram for describing a method for identifying a peak frequency in a case where a plurality of the vibration detection units is used. FIG. 4A illustrates a first case where the peak frequency can be identified, and FIG. 4B illustrates a second case where the peak frequency cannot be identified. FIGS. 4A and 4B each illustrate frequency spectrums obtained from vibration data about a first vibration detection unit 1-1, frequency spectrums obtained from vibration data about a second vibration detection unit 1-2, and frequency spectrums obtained from vibration data about a third vibration detection unit 1-3 in order from the left to the right in the plane of the drawings. Top, middle, and bottom parts are similar to those in FIG. 3, respectively, and a horizontal axis and a vertical axis of each of these drawings are also similar to those in FIG. 3. FIG. 5 is a schematic diagram for describing a first method for setting a monitoring peak frequency. FIG. 5A illustrates frequency spectrums (frequency spectrums in a healthy state of the rolling bearing) immediately after new installation or overhaul, and FIG. 5B illustrates frequency spectrums (frequency spectrums after aging, frequency spectrums after elapse of predetermined period) one year after the case illustrated in FIG. 5A. A top, middle and bottom parts are similar to those in FIG. 3, and a horizontal axis and a vertical axis of each of these drawings are also similar to those in FIG. 3. FIG. 6 is a schematic diagram for describing a second method for setting the monitoring peak frequency. In FIG. 6, a horizontal axis represents an elapsed time, and a vertical axis represents a change rate of the peak frequency. FIG. 7 is a diagram for describing an abnormality determination method. In FIG. 7, a horizontal axis represents an elapsed time, and a vertical axis represents the peak value of a peak at the monitoring peak frequency.

For example, as illustrated in FIG. 1, a rolling bearing abnormality detection device VD according to the embodiment includes vibration detection units 1 (1-1 to 1-3), a control processing unit 2, an input unit 3, an output unit 4, an interface unit (IF unit) 5, and a storage unit 6.

The vibration detection units 1 are devices that are connected to the control processing unit 2 and detect a vibration generated in the rolling bearing as vibration data under the control of the control processing unit 2. Although the number of the vibration detection units 1 may be one, in the present embodiment, a plurality of the vibration detection units 1, that is, in one example, three first to third vibration detection units 1-1 to 1-3 are provided. The first to third vibration detection units 1-1 to 1-3 are disposed in, for example, a device, such as mechanical equipment including a rolling bearing, which is a target for detecting an abnormality.

The mechanical equipment is an example of the device including a rolling bearing, and may be any equipment including a rolling bearing. For example, the mechanical equipment M is a gear reducer M illustrated in FIG. 2, and generally includes first to third rolling bearings BE-1 to BE-3, first and second rotation shafts AX-1 and AX-2, first and second gears GA-1 and GA-2, and a housing, not illustrated, that houses the first to third rolling bearings BE-1 to BE-3, the first and second rotation shafts AX-1 and AX-2, and the first and second gears GA-1 and GA-2. The first rotation shaft AX-1 is fixed to the first gear GA-1, is the rotation shaft of the first gear GA-1, and is supported by the first rolling bearing BE-1. The second rotation shaft AX-2 is fixed to the second gear GA-2, is the rotation shaft of the second gear GA-1, and is supported by the second and third rolling bearings BE-2 and BE-3. The first gear GA-1 and the second gear GA-2 are meshed with each other, and for example, the rotational force generated by the rotation of the first rotation shaft AX-1 is transmitted to the second rotation shaft AX-2 via the first and second gears GA-1 and GA-2, and the second rotation shaft AX-2 rotates.

In the gear reducer M having such a configuration, the first to third vibration detection units 1-1 to 1-3 are disposed on the outer circumferences of the first to third rolling bearings BE-1 to BE-3, respectively. Note that the vibration detection units 1 may be disposed, for example, in the housing, that is, the disposing positions thereof are not limited to the rolling bearings BE. In short, the vibration detection units 1 (1-1 to 1-3) are disposed at locations where vibrations caused by the rolling bearings BE propagate. The vibration detection units 1 (1-1 to 1-3) are acceleration sensors, acoustic emission (AE) sensors, or the like, and appropriate sensors are used in accordance with the frequencies of vibrations to be detected. The vibration detection units 1 (1-1 to 1-3) output the detection results as vibration data to the control processing unit 2.

The input unit 3 is a device that is connected to the control processing unit 2 and inputs, to the rolling bearing abnormality detection device VD, various commands, such as a command for instructing the start of identification of a peak frequency and a command for instructing the start of detection of an abnormality (start of monitoring), and various data, such as a mechanical equipment name of a detection target (monitoring target), necessary for operating the rolling bearing abnormality detection device VD. Examples of the input unit 3 are a plurality of input switches to which predetermined functions are assigned, a keyboard, and a mouse. The output unit 4 is a device that is connected to the control processing unit 2 and outputs commands and data input from the input unit 3, vibration data, and the like under the control of the control processing unit 2, and is, for example, a display device, such as a cathode ray tube (CRT) display, a liquid crystal display, and an organic electroluminescence (EL) display, and a printing device such as a printer.

Note that the input unit 3 and the output unit 4 may constitute a so-called touch panel. In the case of configuring the touch panel, the input unit 3 is a position input device that detects and inputs an operation position of, for example, a resistance film type or a capacitive type, and the output unit 4 is a display device. In this touch panel, the position input device is provided on a display surface of the display device, and one or a plurality of input content candidates that can be input to the display device are displayed. When a user touches a display position where an input content desired to be input is displayed, the position input device detects the position, and the display content displayed at the detected position is input to the rolling bearing abnormality detection device VD as a user's operation input content. In such a touch panel, since the user can easily intuitively understand the input operation, the rolling bearing abnormality detection device VD which is easy for the user to handle is provided.

The IF unit 5 is a circuit that is connected to the control processing unit 2 and inputs and outputs data to and from an external device under the control of the control processing unit 2, and is, for example, an interface circuit of RS-232C which is a serial communication system, an interface circuit using the Bluetooth (registered trademark) standard, an interface circuit that performs infrared communication such as an Infrared Data Association (IrDA) standard, or an interface circuit using a Universal Serial Bus (USB) standard. Further, the IF unit 5 is a circuit that communicates with an external device, and may be, for example, a data communication card, or a communication interface circuit according to the Institute of Electrical and Electronics Engineers (IEEE) 802.11 standard.

The storage unit 6 is a circuit that is connected to the control processing unit 2 and stores various predetermined programs and various predetermined data under the control of the control processing unit 2. The various predetermined programs are, for example, control processing programs that include a control program for controlling each of the units 1 and 3 to 6 of the rolling bearing abnormality detection device VD in accordance with the function of each unit, a spectrum processing program for obtaining a frequency spectrum of vibration data detected by the vibration detection units 1 (1-1 to 1-3), a peak frequency identification program for identifying a frequency indicating a peak within a predetermined frequency range including a theoretical frequency that brings about a peak on the frequency spectrum during occurrence of an abnormality as a peak frequency, from the frequency spectrum obtained by the spectrum processing program, a monitoring target setting program for setting the peak frequency as a monitoring peak frequency of a monitoring target in a case where the peak frequency identified by the peak frequency identification program changes with time, and an abnormality determination program for making a determination whether an abnormality is present in the rolling bearing, based on a peak value of a peak corresponding to a monitoring peak frequency set by the monitoring target setting program. The various predetermined data include data necessary for executing these programs on, for example, vibration data detected by the vibration detection units 1 (1-1 to 1-3), the theoretical frequency, the peak frequency identified by the peak frequency identification program, and the monitoring peak frequency set by the monitoring target setting program. Such a storage unit 6 includes a read only memory (ROM) that is a nonvolatile storage element, an electrically erasable programmable read only memory (EEPROM) which is a rewritable nonvolatile storage element, and the like. The storage unit 6 includes a random access memory (RAM) serving as a so-called working memory of the control processing unit 2 that stores data and the like generated during execution of the predetermined programs. Note that the storage unit 6 may include a hard disk device capable of storing a large capacity of data in order to store learning data having a relatively large capacity.

The control processing unit 2 is a circuit that controls each of the units 1 and 3 to 6 of the rolling bearing abnormality detection device VD in accordance with the function of each of the units to detect an abnormality in the rolling bearing (abnormality in the mechanical equipment including the rolling bearing). The control processing unit 2 includes, for example, a central processing unit (CPU) and its peripheral circuits. In the control processing unit 2, a control unit 21, a spectrum processing unit 22, a peak frequency identification unit 23, a monitoring target setting unit 24, and an abnormality determination unit 25 are functionally configured by executing the control processing programs.

The control unit 21 controls each of the units 1 and 3 to 6 of the rolling bearing abnormality detection device VD in accordance with the function of each of the units to entirely control the rolling bearing abnormality detection device VD. The control unit 21 performs control in accordance with an operation mode of the rolling bearing abnormality detection device VD. In the present embodiment, since the rolling bearing abnormality detection device VD determines presence or absence of an abnormality in the rolling bearing after setting the monitoring peak frequency, the operation mode includes a monitoring peak frequency setting mode which is a mode for setting a monitoring peak frequency and an abnormality monitoring mode which is a mode for monitoring an abnormality in the rolling bearing (an abnormality in the mechanical equipment including the rolling bearing). The control unit 21 stores the vibration data detected by the vibration detection units 1 (1-1 to 1-3) in the storage unit 6 in association with detection times. More specifically, the control unit 21 acquires detection results of the vibration detection units 1 (1-1 to 1-3) for a predetermined time (predetermined time length) at predetermined sampling intervals, and stores the detection results continuous in time series at the sampling intervals in the storage unit 6 as vibration data in association with the detection times. Since the vibration data depends on the rotation speed of the gear reducer M, in the present embodiment, a tachometer (for example, a pulse generator (rotary encoder) or the like), not illustrated, that measures the rotation speed of the gear reducer M is disposed in the gear reducer M. Further, the control unit 21 acquires outputs from the tachometer in synchronization with the detection results of the vibration detection units 1 (1-1 to 1-3), and also stores the outputs from the tachometer in the storage unit 6 in association with the vibration data. That is, the control unit 21 acquires the detection results of the vibration detection units 1 (1-1 to 1-3) and the outputs from the tachometer for the predetermined time (predetermined time length) at the predetermined sampling intervals, and stores the detection results and the outputs continuous in time series at the sampling intervals in the storage unit 6 as vibration data and rotation speed data in association with the detection times. Since the temporal change of the peak frequency is observed, the control unit 21 performs the processing for acquiring the vibration data and the rotation speed data at least twice at a predetermined time interval. The predetermined time interval (first time interval, monitoring peak frequency setting period) is appropriately set to, for example, 3 months, 6 months, or 12 months. Note that, in a sensorless case (a case where the tachometer is not used), a vibration component caused by a change in the rotation speed of the gear reducer M may be extracted from the vibration data, and rotation speed data may be generated from the extracted vibration component.

The spectrum processing unit 22 obtains the frequency spectrum of the vibration data detected by the vibration detection units 1 (1-1 to 1-3). More specifically, as preprocessing, the spectrum processing unit 22 removes (corrects) the influence of the change in the rotation speed from the vibration data based on the rotation speed data using known conventional means, obtains vibration data in a case where the gear reducer M rotates constantly at a predetermined rotation speed, and performs, for example, fast Fourier transform on the obtained vibration data to obtain a frequency spectrum of the vibration data. The frequency spectrum is obtained for each vibration data acquired for each monitoring peak frequency setting period.

The peak frequency identification unit 23 identifies, as a peak frequency, a frequency indicating a peak within a predetermined frequency range including a theoretical frequency that brings about a peak on the frequency spectrum during occurrence of an abnormality, from the frequency spectrum obtained by the spectrum processing unit 22. In the present embodiment, the peak frequency identification unit 23 further identifies one or more frequencies indicating a peak at a frequency that is an integer multiple of the peak frequency as one or more integer multiple peak frequencies. For example, a two-fold peak frequency indicating a peak at a two-fold frequency and a three-fold peak frequency indicating a peak at a three-fold frequency are identified. Note that the integer multiple frequency is not limited to them, and is appropriately set to, for example, two-fold, three-fold, and four-fold frequencies, and three-fold and four-fold frequencies, two-fold and four-fold frequencies, and three-fold and five-fold frequencies, and the like. In the present embodiment, the peak frequency identification unit 23 finally sets, as the peak frequency, a frequency that can be set as the peak frequency for at least two of the plurality of pieces of vibration data detected by the plurality of vibration detection units 1.

The theoretical frequency ft that brings about a peak on the frequency spectrum during occurrence of an abnormality is known, and varies depending on a portion where a damage of the rolling bearing (bearing damage) occurs, and is, for example, as shown in Table 1 below. The portion of the bearing damage is, for example, an inner ring, an outer ring, a rolling element, and a holder. Here, fti represents a theoretical frequency in a case where a bearing damage occurs in the inner ring, fto represents a theoretical frequency in a case where a bearing damage occurs in the outer ring, ftb represents a theoretical frequency in a case where a bearing damage occurs in the rolling element, and ftm represents a theoretical frequency in a case where a bearing damage occurs in the holder. Reference sign d represents a diameter of the rolling element, D represents a pitch circle diameter of the rolling element, Z represents the number of rolling elements, and a represents a contact angle.

TABLE 1

| PORTION OF BEARING DAMAGE | THEORETICAL FREQUENCY ft |
|---|---|
| INNER RING $f_{ti}$ | $\dfrac{Zf_0}{2}\left(1 + \dfrac{d}{D}\cos\alpha\right)$ |
| OUTER RING $f_{to}$ | $\dfrac{Zf_0}{2}\left(1 - \dfrac{d}{D}\cos\alpha\right)$ |
| ROLLING ELEMENT $f_{tb}$ | $\dfrac{f_0 D}{2d}\left\{1 - \left(\dfrac{d}{D}\right)^2 \cos^2\alpha\right\}$ |
| HOLDER $f_{tm}$ | $\dfrac{f_0}{2}\left(1 - \dfrac{d}{D}\cos\alpha\right)$ |

The frequency range for identifying the peak frequency with respect to the theoretical frequencies ft (fti, fto, ftb, ftm) is, for example, ±dft around the theoretical frequency ft, and is set as shown in Table 2 below for 1 to n times. Note that an operator*is a multiplication operator. For example, each frequency range for each of one-fold, two-fold, and three-fold theoretical frequencies in the case where a bearing damage occurs in the outer ring is fto−dft to fto+dft, 2*fto−2*dft to 2*fto+2*dft, and 3*fto−3*dft to 3*fto+3*dft.

TABLE 2

| | CENTER FREQUENCY | LOWER LIMIT FREQUENCY | UPPER LIMIT FREQUENCY |
|---|---|---|---|
| ONE TIME | ft | ft − dft | ft + dft |
| TWO TIMES | 2*ft | 2*(ft − dft) | 2*(ft + dft) |
| THREE TIMES | 3*ft | 3*(ft − dft) | 3*(ft + dft) |
| FOUR TIMES | 4*ft | 4*(ft − dft) | 4*(ft + dft) |
| . . . | . . . | . . . | . . . |
| n TIMES | n*ft | n*(ft − dft) | n*(ft + dft) |

In a case where the peak frequency and the integer multiple peak frequencies are identified, the peak frequency identification unit 23, identifies, as the peak frequency, a frequency of a peak commonly present in a frequency spectrum within a frequency range of the theoretical frequency and a frequency spectrum within a frequency range that is an integral multiple of the theoretical frequency. For example, in a case where each frequency spectrum illustrated in FIG. 3 is obtained from the vibration data in one vibration detection unit 1, although a peak is not present at a frequency 2*f1 and a frequency 3*f1 that are respectively two times and three times a frequency f1 of a peak present in a frequency spectrum (top part) within the frequency range ft−dft to ft+dft of the theoretical frequency ft, a peak is not preset in a frequency spectrum (middle part) within the frequency range 2*ft−2*dft to 2*ft+2*dft two times the theoretical frequency ft and in a frequency spectrum (bottom part) within the frequency range 3*ft−3*dft to 3*ft+3*dft three times the theoretical frequency ft. Therefore, the peak frequency identification unit 23 does not identify a frequency f1 as the peak frequency. On the other hand, a peak is also present in a frequency spectrum (middle part) at the frequency 2*f2 and the frequency 3*f2 that are respectively two times and three times the frequency f2 of the peak present in a frequency spectrum (top part) within the frequency range ft–dft to ft+dft of the theoretical frequency ft, within the frequency range 2*ft–2*dft to 2*ft+2*dft two times the theoretical frequency ft, and in a frequency spectrum (bottom part) within the frequency range 3*ft–3*dft to 3*ft+3*dft three times the theoretical frequency ft. Therefore, the peak frequency identification unit 23 identifies the frequency f2 as a peak frequency. For example, the peak frequency and the integer multiple peak frequency can be identified by executing such identification processing for each peak (for example, each peak having a level equal to or greater than a predetermined threshold) present in the frequency spectrum within the frequency range ft–dft to ft+dft of the theoretical frequency ft.

In a case where the plurality of vibration detection units 1 is used and the peak frequency and the integer multiple peak frequency are identified, the vibration generated in the rolling bearing BE propagates through the rotation shaft AX, the gear GA, the housing, and the like, and is detected by the plurality of vibration detection units 1. Therefore, for at least two of the plurality of pieces of vibration data detected by the plurality of vibration detection units 1, the peak frequency identification unit 23 identifies, as the peak frequency, the frequency of the peak commonly present in the frequency spectrum within the frequency range that is an integral multiple of the theoretical frequency and the frequency spectrum in the frequency range with respect to the integer multiple of the theoretical frequency. For example, in a case where the frequency spectrums illustrated in FIGS. 4A and 4B are obtained correspondingly from the vibration data in the three first to third vibration detection units 1-1 to 1-3, first in FIG. 4B, in the first vibration detection unit 1-1, a peak of a frequency f4, which is present in a frequency spectrum (top part) within the frequency range ft–dft to ft+dft of the theoretical frequency ft, is also present at a frequency 2*f4 in a frequency spectrum (middle part) within the frequency range 2*ft–2*dft to 2*ft+2*dft two times the theoretical frequency ft and at a frequency 3*f4 in a frequency spectrum (bottom part) within the frequency range 3*ft–3*dft to 3*ft+3*dft three times the theoretical frequency ft. Therefore, the frequency f4 is a candidate for the peak frequency. However, in the second and third vibration detection units 1-2 and 1-3, since no peak is present in each frequency spectrum (each top part) within the frequency range ft–dft to ft+dft of the theoretical frequency ft, in each frequency spectrum (each middle part) within the frequency range 2*ft–2*dft to 2*ft+2*dft two times the theoretical frequency ft, and in each frequency spectrum (each bottom part) within the frequency range 3*ft–3*dft to 3*ft+3*dft three times the theoretical frequency ft, the peak frequency identification unit 23 finally does not identify the frequency f4 as the peak frequency. On the other hand, in FIG. 4A, in the first vibration detection unit 1-1, a peak of a frequency f3 in a frequency spectrum (top part) within the frequency range ft–dft to ft+dft of the theoretical frequency ft is also present at a frequency 2*f3 in a frequency spectrum (middle part) within the frequency range 2*ft–2*dft to 2*ft+2*dft two times the theoretical frequency ft and at a frequency 3*f3 in a frequency spectrum (bottom part) within the frequency range 3*ft–3*dft to 3*ft+3*dft three times the theoretical frequency ft. Therefore, the frequency f4 is a candidate for the peak frequency. Further, in the second and third vibration detection units 1-2 and 1-3, since a peak is present also in each frequency spectrum (each top part) within the frequency range ft–dft to ft+dft of the theoretical frequency ft, in each frequency spectrum (each middle stage) within the frequency range 2*ft–2*dft to 2*ft+2*dft two times the theoretical frequency ft, and in each frequency spectrum (each bottom part) within the frequency range 3*ft–3*dft to 3*ft+3*dft three times the theoretical frequency ft, the peak frequency identification unit 23 finally identifies the frequency f3 as the peak frequency. For example, the peak frequency is finally specified by executing such identification processing for each peak (for example, each peak having a level equal to or greater than a predetermined threshold) present in the frequency range ft–dft to ft+dft of the theoretical frequency ft in the frequency spectrum of the vibration data detected by the first vibration detection unit 1-1, and the peak frequency and the integer multiple peak frequency can be identified. In the case illustrated in FIG. 4A, the peak is commonly present in all the three first to third vibration detection units—1 to 1-3, but as described above, may be present in at least two of them.

In a case where the peak frequency identified by the peak frequency identification unit 23 changes with time, the monitoring target setting unit 24 sets the peak frequency as the monitoring peak frequency of a monitoring target. In the present embodiment, the monitoring target setting unit 24 further sets at least one of the one or more integer multiple peak frequencies as the monitoring peak frequency and adds the monitoring peak frequency in a case where the one or more integer multiple peak frequencies identified by the peak frequency identification unit 23 change with time in synchronization with a temporal change of the peak frequency.

For example, as illustrated in FIG. 5A, in a case where a first peak frequency a [Hz] and first integer multiple peak frequencies 2*a and 3*a [Hz], a second peak frequency b [Hz], and second integer multiple peak frequencies 2*b and 3*b [Hz] are identified immediately after the newly installation or overhaul of the gear reducer M, respective peaks of the second peak frequency b [Hz] and the second integer multiple peak frequencies 2*b and 3*b [Hz] do not change with time one year later as illustrated in FIG. 5B, and peaks of the first peak frequency a [Hz] and the first integer multiple peak frequencies 2*a and 3*a [Hz] synchronously change with time by Δc, 2*Δc, and 3*Δc, respectively. In this case, the monitoring target setting unit 24 sets the first peak frequency a [Hz] and the first integer multiple peak frequencies 2*a and 3*a [Hz] as the monitoring peak frequencies.

As described above, the monitoring peak frequency may be set by one temporal change, but in the present embodiment, the monitoring peak frequency is set by a plurality of temporal changes. That is, in a case where the peak frequency identified by the peak frequency identification unit changes with time a plurality of times at a plurality of different time points, the monitoring target setting unit 24 sets the peak frequency as the monitoring peak frequency of a monitoring target.

For example, FIG. 6 illustrates a result of observing the peak frequencies identified by the peak frequency identification unit 23 a plurality of times at every predetermined period (second period, follow-up period) during a monitoring peak frequency setting period. As illustrated in FIG. 6, when the second peak frequency b [Hz] (Δ) described above with reference to FIG. 5 is observed a plurality of times (12 times for every 1-month follow-up period in this example) during the monitoring peak frequency setting period (one year in this example), no change occurs at each time. On the other hand, the first peak frequency a [Hz] (•) described above with reference to FIG. 5 gradually changes with time at each time, and changes with time a plurality of times. In the example illustrated in FIG. 6, the change rate (=Δc/(one month)) of the temporal change per unit time is substantially constant (one month is 30 days). Note that the change in the frequency may not only increase but also decrease or discontinuously increase or decrease. The monitoring target setting unit 24 sets, as the monitoring peak frequency of a monitoring target, the first peak frequency a [Hz] that has observed as for a tendency to change with time a plurality of times and gradually change at each time. On the other hand, the monitoring target setting unit 24 does not set, as the monitoring peak frequency of a monitoring target, the second peak frequency b [Hz] that does not approximately change with time in each time. Note that although only the peak frequency is illustrated in FIG. 6, the same applies to an integer multiple peak frequency (the first integer multiple peak frequencies 2*a and 3*a [Hz], and the second integer multiple peak frequencies 2*b and 3*b [Hz]).

The abnormality determination unit 25 determines whether an abnormality is present in the rolling bearing, based on the peak value of the peak at the monitoring peak frequency set by the monitoring target setting unit 24. In the present embodiment, the abnormality determination unit 25 determines whether an abnormality is present in the rolling bearing, based on a predetermined threshold referred to the peak value of the peak at the monitoring peak frequency in a healthy state of the rolling bearing. The healthy state of the rolling bearing means a state where no abnormality is present in the rolling bearing (the mechanical equipment including the rolling bearing), for example, immediately after the rolling bearing (the mechanical equipment including the rolling bearing) is newly installed (at a new installation time) or immediately after the rolling bearing (the mechanical equipment including the rolling bearing) is overhauled (at an overhauling time). The threshold may be appropriately set based on the peak value of the peak at the monitoring peak frequency in the healthy state of the rolling bearing, but is set to, for example, an integer value such as 3, 4, or 5 (an integer multiple of a value "1" serving as a reference) in a case where the peak value of the peak at the monitoring peak frequency in the healthy state of the rolling bearing is set to the value "1". In this case, the abnormality determination unit 25 obtains, as an evaluation value, a ratio of a peak value of a peak corresponding to the monitoring peak frequency at the current abnormality determination time to the peak value of the peak at the monitoring peak frequency in the healthy state of the rolling bearing, and determines whether an abnormality is present in the rolling bearing, based on the obtained evaluation value and the predetermined threshold (evaluation value=(the peak value of the peak corresponding to the monitoring peak frequency at the current abnormality determination time)/(the peak value of the peak at the monitoring peak frequency in the healthy state of the rolling bearing)).

In the example illustrated in FIG. 7, the threshold also includes a second threshold Th2 for determining a sign of an abnormality (reference 1<Th2<Th1) in addition to a first threshold Th1 for determining presence or absence of an abnormality. When determining presence or absence of an abnormality and determines that the abnormality is present, the abnormality determination unit 25 outputs a warning of the abnormality from the output unit 4. Further, when determining presence or absence of a sign of an abnormality and determining that the sign of the abnormality is present, the abnormality determination unit 25 outputs a sign of the abnormality from the output unit 4. For example, the rolling bearing abnormality detection device VD obtains a peak value of a peak corresponding to the monitoring peak frequency at a predetermined time interval such as one day or one week, obtains an evaluation value of the obtained peak value using the abnormality determination unit 25, and compares the obtained evaluation value with each of the first threshold Th1 and the second threshold Th2. When the obtained evaluation value is equal to or greater than the first threshold Th1 as a result of the comparison, the rolling bearing abnormality detection device VD determines that an abnormality is present and outputs an abnormality warning from the output unit 4. When the obtained evaluation value is smaller than the first threshold Th1 and equal to or greater than the second threshold Th2, the rolling bearing abnormality detection device VD determines that a sign of the abnormality is present and outputs sign warning from the output unit 4. When the obtained evaluation value is smaller than the second threshold Th2, and, the rolling bearing abnormality detection device VD determines that there is no abnormality and no sign and outputs absence of an abnormality and absence of a sign from the output unit 4. Note that the processing may be ended without outputting the absence of an abnormality and the absence of a sign.

The control processing unit 2, the input unit 3, the output unit 4, the IF unit 5, and the storage unit 6 can be configured by, for example, a desktop computer, a notebook computer, a tablet computer, or the like.

Next, an operation of the present embodiment will be described. FIG. 8 is a flowchart illustrating an operation of the rolling bearing abnormality detection device regarding a monitoring peak frequency setting mode. FIG. 9 is a flowchart illustrating an operation of the rolling bearing abnormality detection device regarding an abnormality monitoring mode.

When the rolling bearing abnormality detection device VD having such a configuration is powered on, initialization of necessary units is executed, and the operation is started. In the control processing unit 2, the control unit 21, the spectrum processing unit 22, the peak frequency identification unit 23, the monitoring target setting unit 24, and the abnormality determination unit 25 are functionally configured by executing the control processing programs.

As described above, the rolling bearing abnormality detection device VD of the embodiment determines presence or absence of an abnormality in the rolling bearing after setting the monitoring peak frequency. Therefore, first, the operation of the rolling bearing abnormality detection device regarding the setting of the monitoring peak frequency will be described, and secondly, the operation of the rolling bearing abnormality detection device regarding the determination of presence or absence of an abnormality in the rolling bearing will be described.

For example, when each of the processing S1 to S7 illustrated in FIG. 8 is executed in the healthy state immediately after the overhaul, the monitoring peak frequency in the healthy state is stored in the storage unit 6 as a reference of the temporal change, and for example, the monitoring peak frequency setting mode is designated and the start thereof is input to the input unit 3, each of processing S1 to S8 illustrated in FIG. 8 is repeatedly executed at each follow-up observation period during the monitoring peak frequency setting period.

In FIG. 8, the rolling bearing abnormality detection device VD first causes the control unit 21 of the control processing unit 2 to acquire the detection results of the vibration detection units 1 (1-1 to 1-3) and the outputs from the tachometer for a predetermined time at predetermined sampling intervals, and stores the detection results and the outputs continuous in time series at the sampling intervals in the storage unit 6 as vibration data and rotation speed data in association with the detection times (S1).

Next, the rolling bearing abnormality detection device VD causes the spectrum processing unit 22 of the control processing unit 2 to remove (correct) the influence of the change in the rotation speed from the vibration data based on the rotation speed data, obtain vibration data in a case where the gear reducer M rotates constantly at a predetermined rotation speed, and store the vibration data in the storage unit 6 (S2).

Next, the rolling bearing abnormality detection device VD causes the spectrum processing unit 22 to obtain a frequency spectrum of the obtained vibration data, and store the frequency spectrum in the storage unit 6 (S3).

Next, the rolling bearing abnormality detection device VD causes the peak frequency identification unit 23 of the control processing unit 2 to obtain the theoretical frequency ft that brings about a peak on the frequency spectrum during occurrence of an abnormality as shown in Table 1, and store the theoretical frequency ft in the storage unit 6 (S4). Note that the theoretical frequency ft may be obtained in advance, and stored in the storage unit 6 to be used.

Next, the rolling bearing abnormality detection device VD causes the peak frequency identification unit 23 to obtain a frequency range including the theoretical frequency ft for detecting a peak frequency and a frequency range including an integer multiple of the theoretical frequency ft for detecting an integer multiple peak frequency as shown in Table 2, and store the obtained frequency ranges in the storage unit 6 (S5). Note that these frequency ranges may be obtained in advance, and stored in the storage unit 6 to be used.

Next, the rolling bearing abnormality detection device VD causes the peak frequency identification unit 23 to temporarily identify a peak frequency and an integer multiple peak frequency in the processing described above with reference to FIG. 3, and store the identified peak frequencies in the storage unit 6 (S6).

Next, the rolling bearing abnormality detection device VD causes the peak frequency identification unit 23 to identify a final peak frequency and an integer multiple peak frequency in the processing described above with reference to FIG. 4, and store the identified peak frequencies in the storage unit 6 (S7).

Next, the rolling bearing abnormality detection device VD causes the monitoring target setting unit 24 of the control processing unit 2 to set the monitoring peak frequency in the processing described above with reference to FIG. 6, and store the monitoring peak frequency in the storage unit 6 (S8). Here, for example, the monitoring peak frequency set in the processing at the end of the monitoring peak frequency setting period is finally set as the monitoring peak frequency.

In such processing, the monitoring peak frequency is set and customized for the actual machine of the mechanical equipment including the rolling bearing.

After the monitoring peak frequency is set, first, the first and second thresholds Th1 and Th2 are set and stored by an operator (user). For example, when the abnormality monitoring mode is designated and the start thereof is input to the input unit 3, each of the processing S11 to S14 illustrated in FIG. 9 is repeatedly executed, for example, at a starting time of the 8-hour per day operation or at every half day or every day in continuous operation (24-hour operation). In the setting of the first and second thresholds Th1 and Th2, in the healthy state, the mechanical equipment is rotated at a constant speed, and a peak value of a peak at the monitoring peak frequency is obtained. For example, 6 and 3 are respectively set to the first and second thresholds Th1 and Th2 based on the peak value, and are stored in the storage unit 6.

In FIG. 9, the rolling bearing abnormality detection device VD obtains a peak value of a peak corresponding to the monitored peak frequency and obtains an evaluation value thereof (S11). More specifically, the control unit 21 obtains vibration data based on each detection result of the first to third vibration detection units 1-1 to 1-3. The spectrum processing unit 22 obtains a frequency spectrum of each vibration data. The abnormality determination unit 25 searches for a peak corresponding to the monitoring peak frequency from each frequency spectrum, obtains a peak value of the searched peak, and obtains an evaluation value of the obtained peak.

Next, the rolling bearing abnormality detection device VD causes the abnormality determination unit 25 of the control processing unit 2 to determine whether the evaluation value of the peak corresponding to the monitored peak frequency obtained in processing S11 is equal to or greater than the first or second threshold Th1 or Th2. As a result of this determination, in a case where the evaluation value is equal to or greater than the first or second threshold Th1 or Th2 (Yes, in a case where the evaluation value is equal to or greater than the first threshold Th1 or is equal to or greater than the second threshold Th2), the rolling bearing abnormality detection device VD then executes processing S13, and ends the current processing. On the other hand, as a result of the determination, in a case where the evaluation value is neither equal to or greater than the first threshold Th1 nor equal to or greater than the second threshold Th2 (No), the rolling bearing abnormality detection device VD then executes processing S14, and ends the current processing.

In this process S13, in a case where the abnormality determination unit 25 determines that the evaluation value is equal to or greater than the second threshold Th2 and smaller than the first threshold Th1, the rolling bearing abnormality detection device VD determines as a sign of an abnormality and outputs a warning of the sign from the output unit 4 to notify about the sign, and in a case where determining that the evaluation value is equal to or greater than the first threshold Th1, the rolling bearing abnormality detection device VD determines as an abnormality and outputs a warning of an abnormality from the output unit 4 to notify about the abnormality.

In the processing S14, the rolling bearing abnormality detection device VD causes the abnormality determination unit 25 to output the absence of an abnormality and the absence of a sign (within an allowable range) from the output unit 4.

Through such processing, the rolling bearing (the mechanical equipment including the rolling bearing) is monitored, the presence or absence of a sign of the abnormality and the presence or absence of the abnormality are determined, and the determination result is output.

The frequency of the vibration in the rolling bearing changes with time due to abrasion or the like. On the other hand, it is considered that the frequency of a vibration due to the gear meshing or a multiple component (harmonic component) of the rotation shaft does not change with time. In the rolling bearing abnormality detection device VD and the rolling bearing abnormality detection method implemented therein of the present embodiment, in a case where the identified peak frequency changes with time, the peak frequency is set as the monitoring peak frequency of a monitoring target. Therefore, the vibration of the rolling bearing can be appropriately detected. Therefore, in the rolling bearing abnormality detection device VD and the rolling bearing abnormality detection method, the presence or absence of an abnormality in the rolling bearing can be determined more appropriately.

In the rolling bearing abnormality detection device VD and the rolling bearing abnormality detection method, at least one of one or a plurality of integer multiple peak frequencies indicating a peak at a frequency that is an integral multiple of the peak frequency is set and added as the monitoring peak frequency. Thus, the vibration in the rolling bearing can be detected more appropriately. Therefore, in the rolling bearing abnormality detection device VD and the rolling bearing abnormality detection method, the presence or absence of an abnormality in the rolling bearing can be determined more appropriately.

In the rolling bearing abnormality detection device VD and the rolling bearing abnormality detection method, since the frequencies of the peaks that can be detected by at least two vibration detection units 1 are set as the peak frequencies, even when the peaks of the peak frequencies are low (when the peak values of the peaks are small), the peaks of the peak frequencies and noises can be easily distinguished, and the vibration in the rolling bearing can be appropriately detected.

In the rolling bearing abnormality detection device VD and the rolling bearing abnormality detection method, since the peak frequency is set as the monitoring peak frequency of a monitoring target in a case where a temporal change occurs a plurality of times at a plurality of different time points, a case where the temporal change occurs can be excluded. Thus, the monitoring peak frequency of the monitoring target can be set more appropriately.

In the rolling bearing abnormality detection device VD and the rolling bearing abnormality detection method, the first threshold Th1 referred to the peak value of the peak at the monitoring peak frequency in the healthy state of the rolling bearing is used for the determination of the presence or absence of an abnormality in the rolling bearing. Therefore, even if there is product variation in the rolling bearing, customization for the rolling bearing can be performed, and the presence or absence of an abnormality in the rolling bearing can be determined.

The present specification discloses various aspects of techniques as described above, of which the main techniques are summarized below.

A rolling bearing abnormality detection device according to one aspect includes a vibration detection unit that detects a vibration generated in a rolling bearing as vibration data, a spectrum processing unit that obtains a frequency spectrum of the vibration data detected by the vibration detection unit, a peak frequency identification unit that identifies, as a peak frequency, a frequency indicating a peak within a predetermined frequency range including a theoretical frequency that brings about a peak on the frequency spectrum during occurrence of an abnormality, from the frequency spectrum obtained by the spectrum processing unit, a monitoring target setting unit that sets the peak frequency as a monitoring peak frequency of a monitoring target in a case where the peak frequency identified by the peak frequency identification unit changes with time, and an abnormality determination unit that determines whether an abnormality is present in the rolling bearing, based on a peak value of a peak corresponding to the monitoring peak frequency set by the monitoring target setting unit.

The frequency of the vibration in the rolling bearing changes with time due to abrasion or the like. The rolling bearing abnormality detection device is a device configured focusing on this point. The rolling bearing abnormality detection device sets the peak frequency as the monitoring peak frequency of the monitoring target in a case where the identified peak frequency changes with time. Therefore, the vibration in the rolling bearing can be appropriately detected.

According to another aspect, in the above-described rolling bearing abnormality detection device, the peak frequency identification unit further identifies one or a plurality of frequencies indicating a peak at a frequency that is an integer multiple of the peak frequency as one or a plurality of integer multiple peak frequencies, and the monitoring target setting unit further sets and adds at least one of the one or the plurality of integer multiple peak frequencies as the monitoring peak frequency in a case where the one or plurality of integer multiple peak frequencies identified by the peak frequency identification unit changes with time in synchronization with the change with time of the peak frequency.

Such a rolling bearing abnormality detection device sets and adds at least one of one or a plurality of integer multiple peak frequencies indicating a peak at a frequency that is an integer multiple of the peak frequency as the monitoring peak frequency. Thus, the vibration in the rolling bearing can be detected more appropriately.

According to another aspect, in the above-described rolling bearing abnormality detection device, the vibration detection unit includes a plurality of the vibration detection units, and the peak frequency identification unit finally sets, as the peak frequency, a frequency that can be set as the peak frequency for at least two of a plurality of pieces of the vibration data detected respectively by the plurality of the vibration detection units.

Since such a rolling bearing abnormality detection device sets the frequencies of the peaks that can be detected by the at least two vibration detection units as the peak frequencies, even in a case where the peaks of the peak frequencies are low, the peaks of the peak frequencies and noises can be easily distinguished, and the vibration in the rolling bearing can be appropriately detected.

According to another aspect, in the above-described rolling bearing abnormality detection device, the monitoring target setting unit sets the peak frequency as the monitoring peak frequency of the monitoring target in a case where the peak frequency identified by the peak frequency identification unit changes with time a plurality of times at a plurality of different time points. Preferably, in the above-described rolling bearing abnormality detection device, the monitoring target setting unit sets the peak frequency as the monitoring peak frequency of a monitoring target in a case where a change rate of the temporal change in the peak frequency identified by the peak frequency identification unit per unit time is constant.

Since such a rolling bearing abnormality detection device sets the peak frequency as the monitoring peak frequency of the monitoring target in a case where a temporal change occurs a plurality of times at a plurality of different time points, a case where the temporal change occurs can be excluded. Thus, the device can set the monitoring peak frequency of a monitoring target more appropriately.

According to another aspect, in the above-described rolling bearing abnormality detection device, the abnormality determination unit determines whether an abnormality is present in the rolling bearing, based on a predetermined threshold referred to the peak value of the peak at the monitoring peak frequency in the healthy state of the rolling bearing. Preferably, in the above-described rolling bearing abnormality detection device, the predetermined threshold is a predetermined ratio in a case where the peak value of the peak at the monitoring peak frequency is set to 1 in the healthy state of the rolling bearing. The abnormality determination unit obtains, as an evaluation value, a ratio of a peak value of a peak corresponding to the monitoring peak frequency at the current abnormality determination time to a peak value of a peak at the monitoring peak frequency in the healthy state of the rolling bearing, and determines whether an abnormality is present in the rolling bearing, based on the obtained evaluation value and the predetermined threshold (the evaluation value=(the peak value of the peak corresponding to the monitoring peak frequency at the current abnormality determination time)/(the peak value of the peak at the monitoring peak frequency in the healthy state of the rolling bearing)).

Since such a rolling bearing abnormality detection device uses a predetermined threshold referred to the peak value of the peak at the monitoring peak frequency in the healthy state of the rolling bearing for the determination of presence or absence of an abnormality in the rolling bearing, even if there is product variation in the rolling bearing, customization for the rolling bearing can be performed, and the determination can be made whether an abnormality is present in the rolling bearing.

A rolling bearing abnormality detection method according to another aspect includes a vibration detection step of detecting a vibration generated in a rolling bearing as vibration data, a spectrum processing step of obtaining a frequency spectrum of the vibration data detected in the vibration detection step, a peak frequency identification step of identifying, as a peak frequency, a frequency indicating a peak within a predetermined frequency range including a theoretical frequency that brings about a peak on the frequency spectrum during occurrence of an abnormality, from the frequency spectrum obtained by the spectrum processing step, a monitoring target setting step of setting the peak frequency as a monitoring peak frequency of a monitoring target in a case where the peak frequency identified in the peak frequency identification step changes with time, and an abnormality determination step of determining whether an abnormality is present in the rolling bearing, based on a peak value of a peak corresponding to the monitoring peak frequency set in the monitoring target setting step.

In such a rolling bearing abnormality detection method, the peak frequency is set as the monitoring peak frequency of the monitoring target in a case where the identified peak frequency changes with time. Therefore, the vibration in the rolling bearing can be appropriately detected.

This application is based on Japanese Patent Application No. 2021-116597 filed on Jul. 14, 2021, the content of which is included in the present application.

Although the present invention has been appropriately and sufficiently described through the embodiment with reference to the above drawings to express the present invention, it should be recognized that a person skilled in the art can easily change and/or improve the above-described embodiment. Therefore, unless a change or improvement made by a person skilled in the art is at a level departing from the scope of rights of the claims described in claims, the change or improvement is interpreted to be included in the scope of rights of the claims.

INDUSTRIAL APPLICABILITY

According to the present invention, a rolling bearing abnormality detection device and a rolling bearing abnormality detection method for detecting an abnormality generated in a rolling bearing can be provided.

The invention claimed is:

1. A rolling bearing abnormality detection device, comprising:

a vibration detection unit that detects a vibration generated in a rolling bearing as vibration data;

a spectrum processing unit that obtains a frequency spectrum of the vibration data detected by the vibration detection unit;

a peak frequency identification unit that identifies, as a peak frequency, a frequency indicating a peak within a predetermined frequency range including a theoretical frequency that brings about a peak on the frequency spectrum during occurrence of an abnormality, from the frequency spectrum obtained by the spectrum processing unit;

a monitoring target setting unit that sets the peak frequency as a monitoring peak frequency of a monitoring target in a case where the peak frequency identified by the peak frequency identification unit changes with time; and an abnormality determination unit that determines whether an abnormality is present in the rolling bearing, based on a peak value of a peak corresponding to the monitoring peak frequency set by the monitoring target setting unit.

2. The rolling bearing abnormality detection device according to claim 1, wherein the peak frequency identification unit further identifies one or a plurality of frequencies indicating a peak at a frequency that is an integer multiple of the peak frequency as one or a plurality of integer multiple peak frequencies, and the monitoring target setting unit further sets and adds at least one of the one or plurality of integer multiple peak frequencies as the monitoring peak frequency in a case where the one or plurality of integer multiple peak frequencies identified by the peak frequency identification unit change with time in synchronization with the change with time of the peak frequency.

3. The rolling bearing abnormality detection device according to claim 1, wherein the vibration detection unit includes a plurality of the vibration detection units, and the peak frequency identification unit finally sets, as the peak frequency, a frequency capable of being set as the peak frequency for at least two of a plurality of pieces of the vibration data respectively detected by the plurality of vibration detection units.

4. The rolling bearing abnormality detection device according to claim 1, wherein the monitoring target setting unit sets the peak frequency as the monitoring peak frequency of a monitoring target in a case where the peak frequency identified by the peak frequency identification unit changes with time a plurality of times at a plurality of different time points.

5. The rolling bearing abnormality detection device according to claim 1, wherein the abnormality determination unit determines whether an abnormality is present in the rolling bearing, based on a predetermined threshold referred to the peak value of the peak at the monitoring peak frequency in the healthy state of the rolling bearing.

6. A rolling bearing abnormality detection method, comprising:

a vibration detection step of detecting a vibration generated in a rolling bearing as vibration data;

a spectrum processing step of obtaining a frequency spectrum of the vibration data detected in the vibration detection step;

a peak frequency identification step of identifying, as a peak frequency, a frequency indicating a peak within a predetermined frequency range including a theoretical frequency that brings about a peak on the frequency spectrum during occurrence of an abnormality, from the frequency spectrum obtained by the spectrum processing step;

a monitoring target setting step of setting the peak frequency as a monitoring peak frequency of a monitoring target in a case where the peak frequency identified in the peak frequency identification step changes with time; and an abnormality determination step of determining whether an abnormality is present in the rolling bearing, based on a peak value of a peak corresponding to the monitoring peak frequency set in the monitoring target setting step.

* * * * *